W. C. ROWELL.
STORAGE BATTERY AND BOX RETAINER.
APPLICATION FILED AUG. 20, 1917.
1,257,931. Patented Feb. 26, 1918.
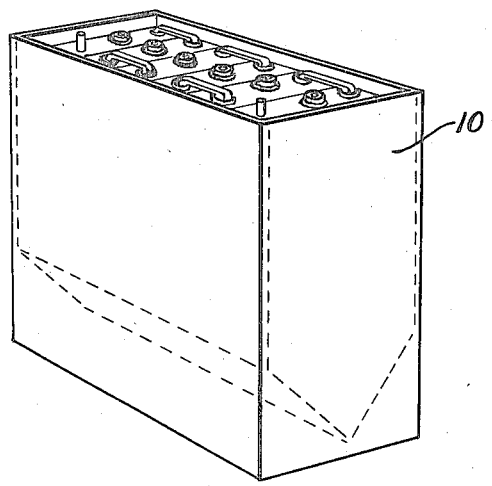
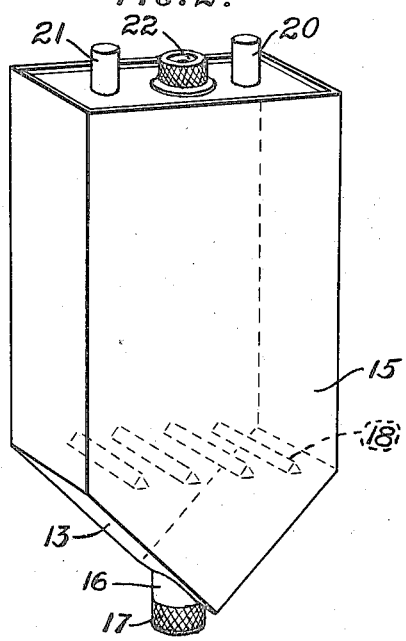
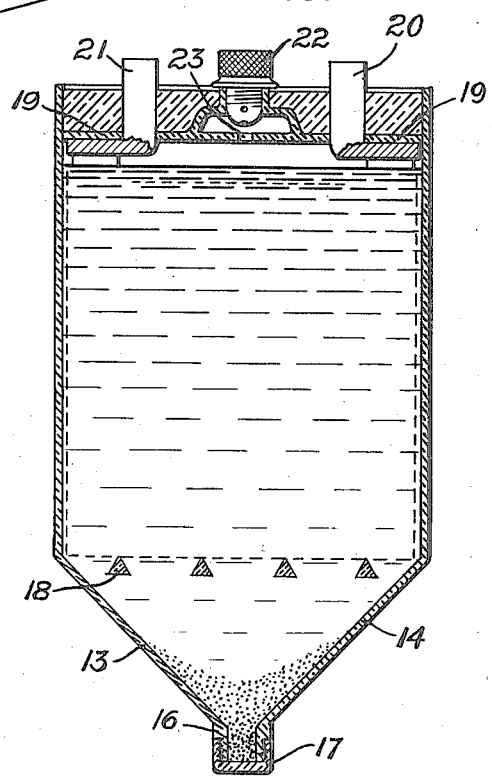
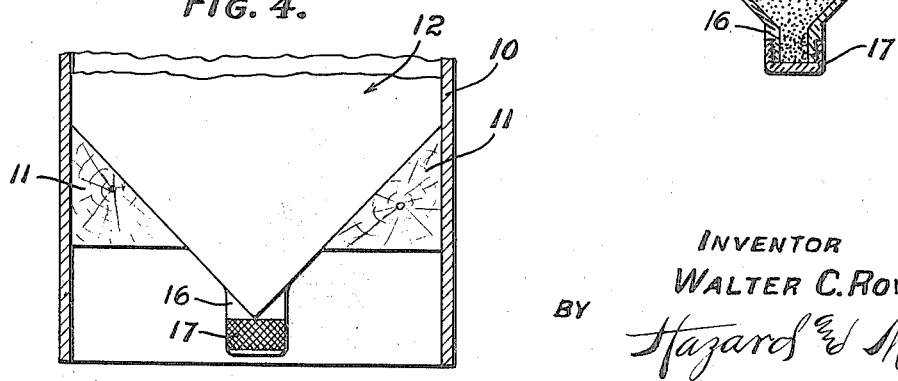
INVENTOR
WALTER C. ROWELL
BY
Hazard & Miller
ATTYS.

UNITED STATES PATENT OFFICE.

WALTER C. ROWELL, OF SANTA ANA, CALIFORNIA.

STORAGE BATTERY AND BOX RETAINER.

1,257,931.          Specification of Letters Patent.          Patented Feb. 26, 1918.

Application filed August 20, 1917. Serial No. 187,184.

*To all whom it may concern:*

Be it known that I, WALTER C. ROWELL, a citizen of the United States, residing at Santa Ana, in the county of Orange and State of California, have invented new and useful Improvements in Storage Batteries and Box Retainers, of which the following is a specification.

This invention relates to a storage battery and retainer therefor.

One of the principal defects in the operation of storage batteries is that the disintegrated material from the plates falls to the bottom of the battery jars and accumulates until it has produced a short circuit between the battery plates, thus causing a rapid leakage of current. It is the principal object of this invention to provide a battery jar which is formed with a bottom portion within which sediment may accumulate for a considerable time without objectionable results and from which the sediment and the electrolyte may be drawn without dismantling the battery and inverting the jar.

Another object of this invention is to provide supporting bars upon which the battery plates rest and which are designed to insure that there will be no accumulation of sediment upon them which might short-circuit the battery plates.

Another object of this invention is to provide a battery box particularly adapted to accommodate the specially formed jar.

Other objects will appear hereinafter.

The invention is illustrated, by way of example, in the accompanying drawings in which:

Figure 1 is a view in perspective illustrating the battery box within which is placed a plurality of battery jars constructed according to the spirit of the present invention.

Fig. 2 is an enlarged view in perspective illustrating one of the specially formed battery jars.

Fig. 3 is a view in transverse section as seen through one of the battery jars disclosing the plate supporting bars and the sediment receiver.

Fig. 4 is a fragmentary view in section and elevation illustrating the lower portion of a battery box and particularly disclosing the manner in which the special jar is supported therein.

Referring more particularly to the drawings, 10 indicates a battery box, here shown as having sides forming a rectangular closure. Positioned within the battery box and preferably secured at the corners thereof are triangular supporting blocks 11 having oppositely inclined faces upon which the bottom of a battery jar 12 may rest. The battery jar is rectangular in section and has a bottom of peculiar formation composed of inclined end walls 13 and 14, and side walls 15. The side walls are a continuation of the sides of the main portion of the jar, while the end walls 13 and 14 are inclined from the ends of the jar and converge at equal angles toward the center and beneath the jar. A tubular drain opening 16 is formed at the point of convergence of the sides 13 and 14 and thus affords means for drawing off the electrolyte from the jar. This member is externally threaded to receive a screw cap 17. Secured between the side walls of the jar and with their upper edges on a plane coincident with the lower edges of the end walls are battery plate supporting bars 18. These bars are parallel to each other and are preferably triangular in section, the apex of said triangle being uppermost and disposed centrally of the bar. This has been done to expose downwardly inclined faces to the cells, thus insuring that disintegrated particles within the electrolyte will not become lodged upon the supporting bars and eventually produce a short circuit thereacross. The upper end of the cell is formed with a closure 19 through which the terminal posts 20 and 21 of the plates extend. A filling cap 22 is also removably positioned over an opening 23 in the top plate 19 to allow the electrolyte to be placed within the jar.

In the use of this battery, the plates are placed in position at rest upon the edges of the supporting bars 18. The cap 17 is placed in position to close the drain opening 16 and thereafter the jar may be filled with a suitable electrolyte. The cells so assembled may then be placed within the box 10 with its inclined sides bearing upon the triangular supporting blocks 11. It will be understood that these blocks are spaced a sufficient distance above the bottom of the box to hold the lower end of the cap above the surface upon which the box rests. When the battery is in use, the electrolytic action which takes place will cause a disintegration of the plates. This substance will form a sediment which will settle to the bottom of the jar. In the present instance it will fall into the lower sediment compartment beneath the supporting bars 18. The inclined end walls of this portion of the jar will cause the sediment to accumulate at the extreme lower end of the jar and will permit it to be readily drained from the jar when the cap 17 is removed. Due to the depth of the sediment compartment, the jar will not have to be drained off. It will be seen, however, that as arranged, the lower ends of the plates and supporting bars will be free from sediment, thereby insuring against any short circuit within the cells.

It will thus be seen that the battery here disclosed will act to prevent short circuits and allow the electrolyte to be readily withdrawn from the cell and renewed, when desired. It will be further noted that the box within which the batteries are placed affords a rigid support and inclosure for the peculiarly shaped jars.

While I have shown the preferred form of my battery and box retainer, it is evident that various changes in the combination, construction and arrangement of parts may be made without departing from the spirit of the invention as claimed.

I claim:

1. A battery comprising a container rectangular in plan, a series of battery jars fitting in the container side by side; each of said battery jars being rectangular in plan and having flat side walls and having flat end walls; the lower ends of the end walls converging at equal angles toward the center and there being a tubular drain opening at the points of convergence; and means in the box for engaging the converging ends of the end walls and supporting the jars.

2. A storage battery jar, comprising a rectangular container, bars of triangular section formed across the lower end of said container for the support of battery plates upon one of their edges, a sediment receptacle formed as a part of the container and disposed beneath the bars, said receptacle having downwardly converging end walls, and means whereby said receptacle may be thoroughly drained, when desired.

3. A battery, comprising a container, triangular blocks secured within the container and adjacent the corners thereof, the angular sides of said blocks downwardly converging, a battery jar adapted to be positioned within the container, a sediment compartment formed at the bottom of said jar and having inwardly converging ends adapted to rest upon the blocks, a tubular drainpipe formed at the point of convergence of said sediment compartment walls, a removable closure cap positioned over said drainpipe, and a series of parallel plate supporting bars of triangular section positioned within the battery box and disposed with their apexes upwardly extending.

In testimony whereof I have signed my name to this specification.

WALTER C. ROWELL.